US012479073B2

(12) United States Patent
Knyrim et al.

(10) Patent No.: US 12,479,073 B2
(45) Date of Patent: Nov. 25, 2025

(54) ECCENTRIC TRANSMISSION FOR A POWER TOOL

(71) Applicant: Hilti Aktiengesellschaft, Schaan (LI)

(72) Inventors: Maximilian Knyrim, Ehingen (DE); Michael Hinterstoisser, Olching (DE); Florian Schmid, Buchs (CH)

(73) Assignee: Hilti Aktiengesellschaft, Schaan (LI)

( * ) Notice: Subject to any disclaimer, the term of this patent is extended or adjusted under 35 U.S.C. 154(b) by 371 days.

(21) Appl. No.: 18/037,255

(22) PCT Filed: Nov. 10, 2021

(86) PCT No.: PCT/EP2021/081220
§ 371 (c)(1),
(2) Date: May 16, 2023

(87) PCT Pub. No.: WO2022/111998
PCT Pub. Date: Jun. 2, 2022

(65) Prior Publication Data

US 2023/0415218 A1 Dec. 28, 2023

(30) Foreign Application Priority Data

Nov. 27, 2020 (EP) .................................... 20210196

(51) Int. Cl.
*B25B 27/10* (2006.01)
*B21D 39/04* (2006.01)

(52) U.S. Cl.
CPC ............ *B25B 27/10* (2013.01); *B21D 39/046* (2013.01); *B21D 39/048* (2013.01)

(58) Field of Classification Search
CPC .... B21D 39/04; B21D 39/046; B21D 39/048; B25B 27/10; B25B 27/146; B25B 27/023;
(Continued)

(56) References Cited

U.S. PATENT DOCUMENTS

| | | | |
|---|---|---|---|
| 5,195,354 | A | 3/1993 | Yasui et al. |
| 5,511,439 | A | 4/1996 | Las Navas |

(Continued)

FOREIGN PATENT DOCUMENTS

| | | | |
|---|---|---|---|
| CN | 1348535 | A | 5/2002 |
| CN | 101448677 | A | 6/2009 |

(Continued)

OTHER PUBLICATIONS

International Search Report of PCT/EP2021/081220 dated Feb. 1, 2022.

(Continued)

*Primary Examiner* — Tyrone V Hall, Jr.
(74) *Attorney, Agent, or Firm* — Davidson Kappel LLC

(57) ABSTRACT

Power tool, in particular a pipe press, including a drive, an output shaft, a threaded spindle drive and a linear actuator, wherein a torque generated by the drive is transmissible via the output shaft, and the threaded spindle drive connected to the output shaft, to the linear actuator. The power tool includes an eccentric transmission device for a torque adaptation between the drive and the threaded spindle drive, wherein the eccentric transmission device includes a drive eccentric, which is drivable by the drive, an eccentric gear, which is drivable by the drive eccentric, and a compensating coupling, which is drivable by the eccentric gear and which serves for transmitting torque from the eccentric gear to the output shaft.

12 Claims, 8 Drawing Sheets

(58) Field of Classification Search
CPC . H01R 43/042; H01R 43/0428; H01R 43/048
See application file for complete search history.

(56) References Cited

U.S. PATENT DOCUMENTS

| | | | |
|---|---|---|---|
| 6,415,641 | B1 | 7/2002 | Wagner et al. |
| 6,763,918 | B1 | 7/2004 | Kapaan et al. |
| 8,298,110 | B2 | 10/2012 | Schueler et al. |
| 9,808,851 | B2 | 11/2017 | Thorson et al. |
| 2005/0103170 | A1 | 5/2005 | Del Rio et al. |
| 2012/0119554 | A1 | 5/2012 | Berres et al. |
| 2012/0284981 | A1 | 11/2012 | Bungter et al. |
| 2016/0288193 | A1* | 10/2016 | Thorson .................. B25B 27/10 |
| 2017/0266791 | A1 | 9/2017 | Barezzani et al. |
| 2021/0237795 | A1 | 8/2021 | Wenk et al. |
| 2021/0339367 | A1 | 11/2021 | Frenken et al. |
| 2021/0402585 | A1 | 12/2021 | Hinterstoisser et al. |

FOREIGN PATENT DOCUMENTS

| | | | |
|---|---|---|---|
| CN | 102481867 | A | 5/2012 |
| DE | 102018209819 | A1 | 12/2019 |
| DE | 102018115788 | A1 | 1/2020 |
| DE | 102018121971 | A1 | 3/2020 |
| DE | 102018124646 | A1 | 4/2020 |
| EP | 1055488 | A2 | 11/2000 |
| EP | 2532480 | A2 | 12/2012 |
| EP | 3075492 | A1 | 10/2016 |
| FR | 3010254 | A1 | 3/2015 |
| KR | 102130846 | B1 | 7/2020 |
| WO | WO 2020099123 | A1 | 5/2020 |
| WO | WO2022111998 | A1 | 6/2022 |
| WO | WO 2022112010 | A1 | 6/2022 |
| WO | WO 2022112021 | A1 | 6/2022 |

OTHER PUBLICATIONS

International Search Report of PCT/EP2021/081503 dated Jan. 31, 2022.

International Search Report of PCT/EP2021/081345 dated Jan. 20, 2022.

* cited by examiner

ECCENTRIC TRANSMISSION FOR A POWER TOOL

The invention relates to a power tool, in particular a pipe press, comprising a drive, an output shaft, a threaded spindle drive and a linear actuator, wherein a torque generated by the drive is transmissible via the output shaft, and the threaded spindle drive connected to the output shaft, to the linear actuator.

BACKGROUND

Various power tools for deformation and cutting processes are known from the prior art. By means of these special power tools, it is for example possible for reinforcement bars to be severed, for pipes to be mechanically connected or for hose clamps to be pressed on. The mechanical connection tasks also include so-called crimping, flanging and squeezing.

In order to realize the high pressing forces required for the crimping of steel pipes, for example, commercially available deformation machines have a pressing head which is driven by a pressing cylinder. Here, the pressing cylinder is commonly hydraulically driven for the purposes of moving the pressing head. An electric motor drives, in turn, a hydraulic pump, which outputs the linear movement of the pressing cylinder. Alternatively, there are also commercially available mechanical pressing/cutting and crimping tools which, instead of the hydraulics, generate the pressing pressure by means of a threaded spindle drive in combination with an electric motor. Here, the rotational movement of the electric motor is transformed by means of a threaded spindle into a linear movement. These power tools commonly comprise a transmission which is connected between spindle and electric motor and which serves for reducing the required motor torque, in order to thus be able to dimension the motor to be smaller.

SUMMARY OF THE INVENTION

However, the power tools known from the prior art which have a hydraulically driven linear actuator tend to be too complex to develop, to be too large or too long with regard to handling, to be inefficient, and to be too heavy. Furthermore, the power tools known from the prior art which have a hydraulically driven linear actuator require a relatively long time for a single working cycle, wherein one working cycle may for example be one deformation or cutting cycle.

An object of the present invention to provide a power tool, in particular a pipe press, comprising a drive, an output shaft, a threaded spindle drive and a linear actuator in order to solve the aforementioned problems.

In particular, the present invention provides a power tool, in particular a pipe press, comprising a drive, an output shaft, a threaded spindle drive and a linear actuator, wherein a torque generated by the drive is transmissible via the output shaft, and the threaded spindle drive connected to the output shaft, to the linear actuator.

According to the invention, the power tool comprises an eccentric transmission device for a torque adaptation between the drive and the threaded spindle drive, wherein the eccentric transmission device comprises a drive eccentric, which is drivable by the drive, an eccentric gear, which is drivable by the drive eccentric, and a compensating coupling, which is drivable by the eccentric gear and which serves for transmitting torque from the eccentric gear to the output shaft.

The compensating coupling can be configured here as a torsionally rigid compensating coupling.

The use of an eccentric transmission device makes it possible to dispense with a hydraulically driven linear actuator, as a result of which the power tool can be less complex to develop and be smaller, more efficient and easier to handle. Furthermore, the use of an eccentric transmission device considerably reduces the duration of a working cycle. Moreover, the use of an eccentric transmission device makes it possible to achieve relatively high transmission ratios in only a single transmission stage. Moreover, the use of an eccentric transmission device makes it possible to realise very high transmission ratios (that is to say for example of 1 to 1000) in only a single gear stage.

The eccentric transmission device can also be referred to as a circular thrust transmission device or cycloidal transmission device. Moreover, the eccentric transmission device can also be referred to as a planetary transmission device which, on the one hand, is configured without a sun gear and, on the other hand, a planet gear is directly driven via an eccentric.

The eccentric transmission device is substantially configured as a planetary transmission, although a sun gear can be dispensed with. The eccentric gear of the eccentric transmission device is directly driven via the drive eccentric.

According to an advantageous embodiment of the present invention, it can be possible for an involute toothing to be present between a ring gear, which is fixedly connected to a housing, and the eccentric gear.

By using an involute toothing, instead of a sliding movement occurring at the respective contact point of the teeth of the ring gear and eccentric gear, there occurs a more efficient rolling movement. Furthermore, it is also made possible hereby for the number of necessary rolling bearings atop or on the ring gear to be reduced to a minimum.

The eccentric gear has an outside diameter which substantially corresponds to an inside diameter of the ring gear. A maximum transmission ratio between the eccentric gear and the ring gear results when the tooth number difference between the eccentric gear and the ring gear is a minimum. The minimum here is a tooth number difference of one.

According to a further advantageous embodiment of the present invention, it can be possible that the compensating coupling is configured as a parallel crank coupling.

The parallel crank coupling can also be referred to as a pin coupling or sliding block coupling.

By using a parallel crank coupling, the relatively slow rotational speed of the output shaft in relation to the rotational speed of the eccentric gear is not limited.

According to a further advantageous embodiment of the present invention, it can be possible that the eccentric transmission device is configured in one stage and with a transmission ratio of 1:10 to 1:100.

According to a further advantageous embodiment of the present invention, it can be possible that the eccentric gear and the ring gear have a tooth number difference of 1 to 2 teeth.

According to a further advantageous embodiment of the present invention, it can be possible that the ring gear has between 20 and 200 teeth.

According to a further advantageous embodiment of the present invention, it can be possible that the ring gear has a maximum inside diameter of between 20 and 200 mm.

According to a further advantageous embodiment of the present invention, it can be possible that the ring gear of the eccentric transmission device is rotatably mounted in the housing.

According to a further advantageous embodiment of the present invention, it can be possible that the eccentric transmission device at least partially consists of a metallic sintered material. The use of a sintered material makes it possible to increase the slidability of the components, that is to say in particular within the eccentric transmission device.

According to a further advantageous embodiment of the present invention, it can be possible that the eccentric transmission device at least partially consists of a polymer. The use of a polymer allows the eccentric transmission device to be produced more favorably and more easily. Moreover, the unbalance and friction can be reduced and the efficiency increased.

Further advantages will become apparent from the following description of the figures.

Various exemplary embodiments of the present invention are illustrated in the figures.

BRIEF DESCRIPTION OF THE DRAWINGS

The figures, the description and the patent claims contain numerous features in combination. A person skilled in the art will expediently also consider the features individually and combine them to produce useful further combinations.

In the figures, identical and similar components and assemblies are denoted by the same reference signs.

Figure 1:
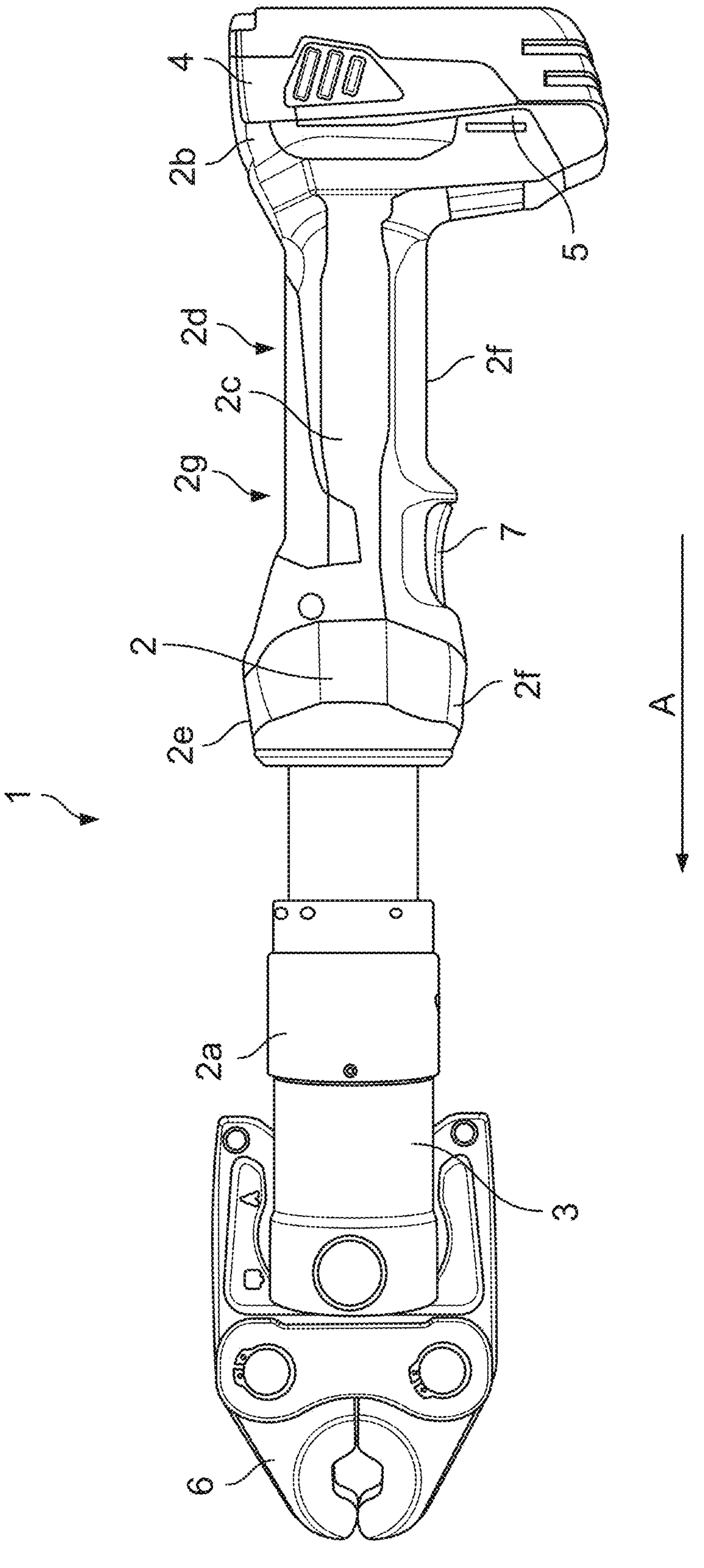
Figure 2:
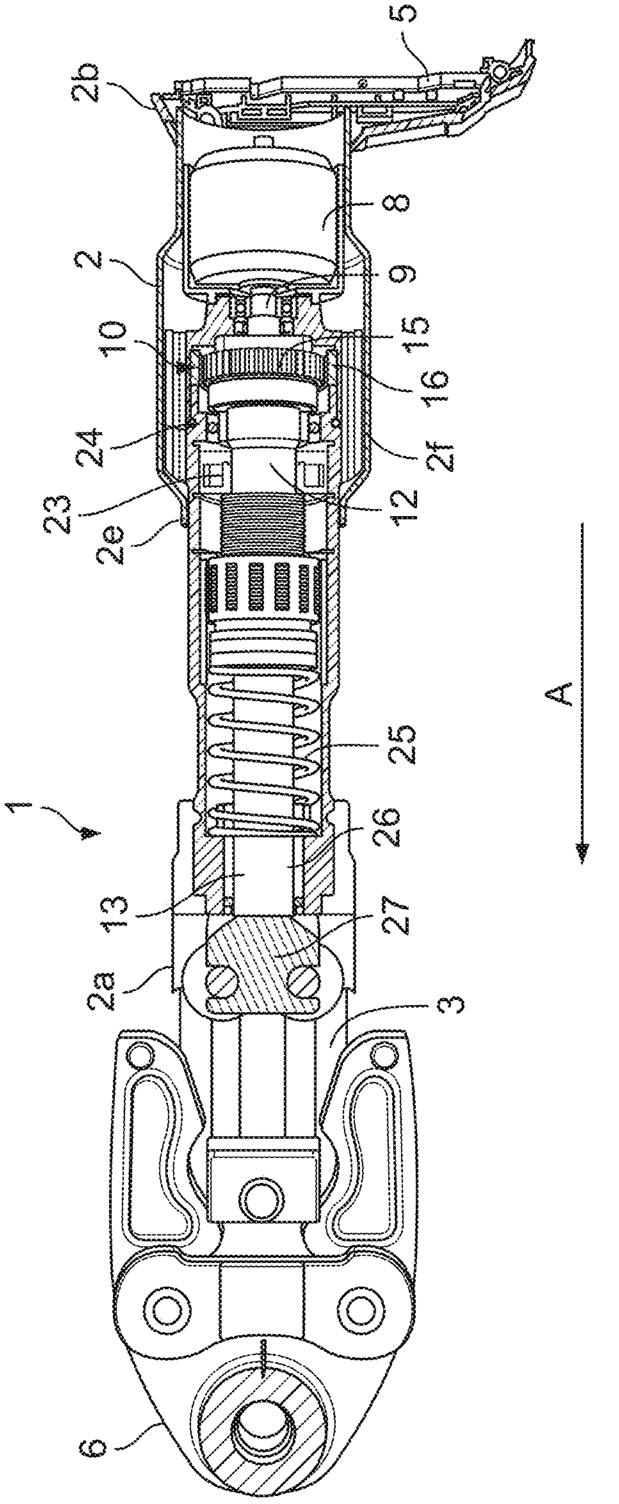
Figure 3:
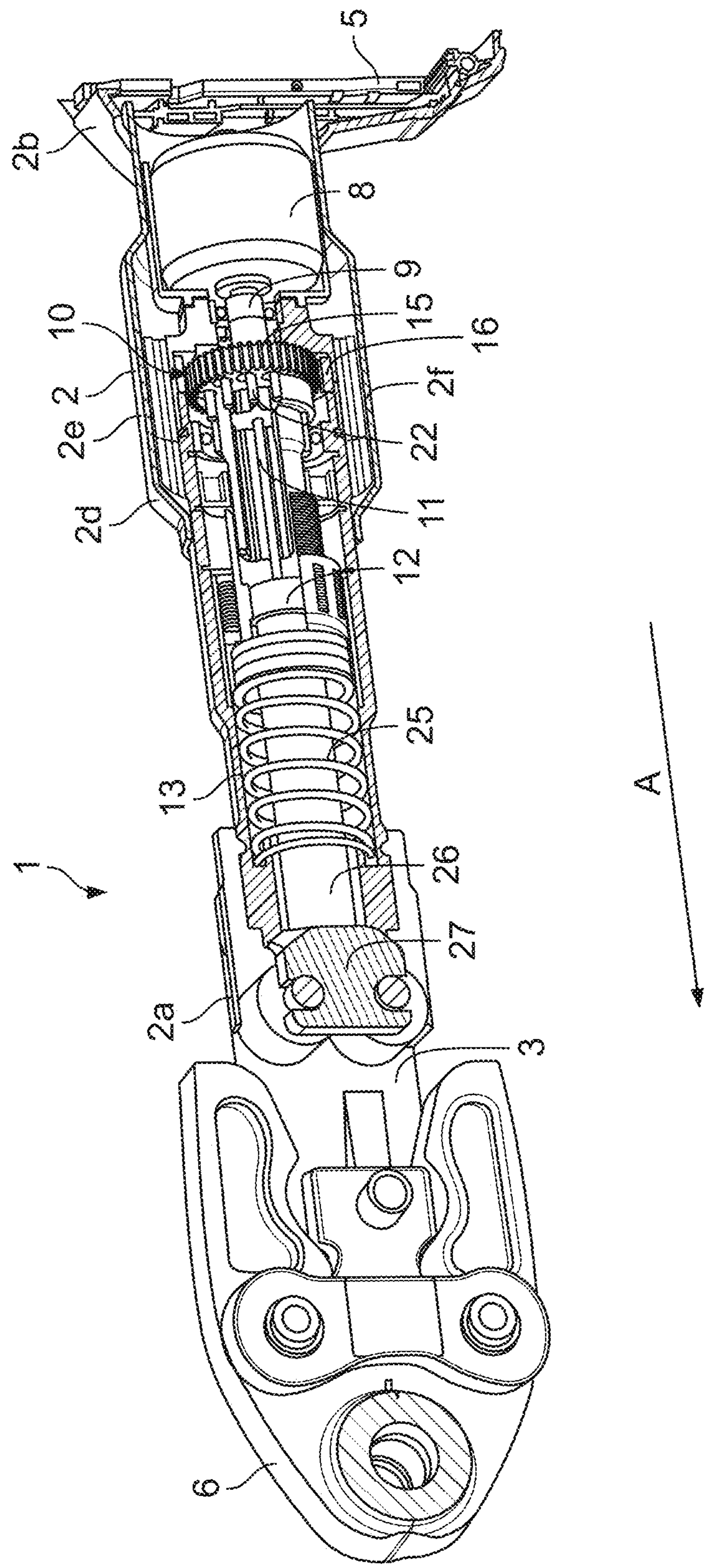
Figure 4:
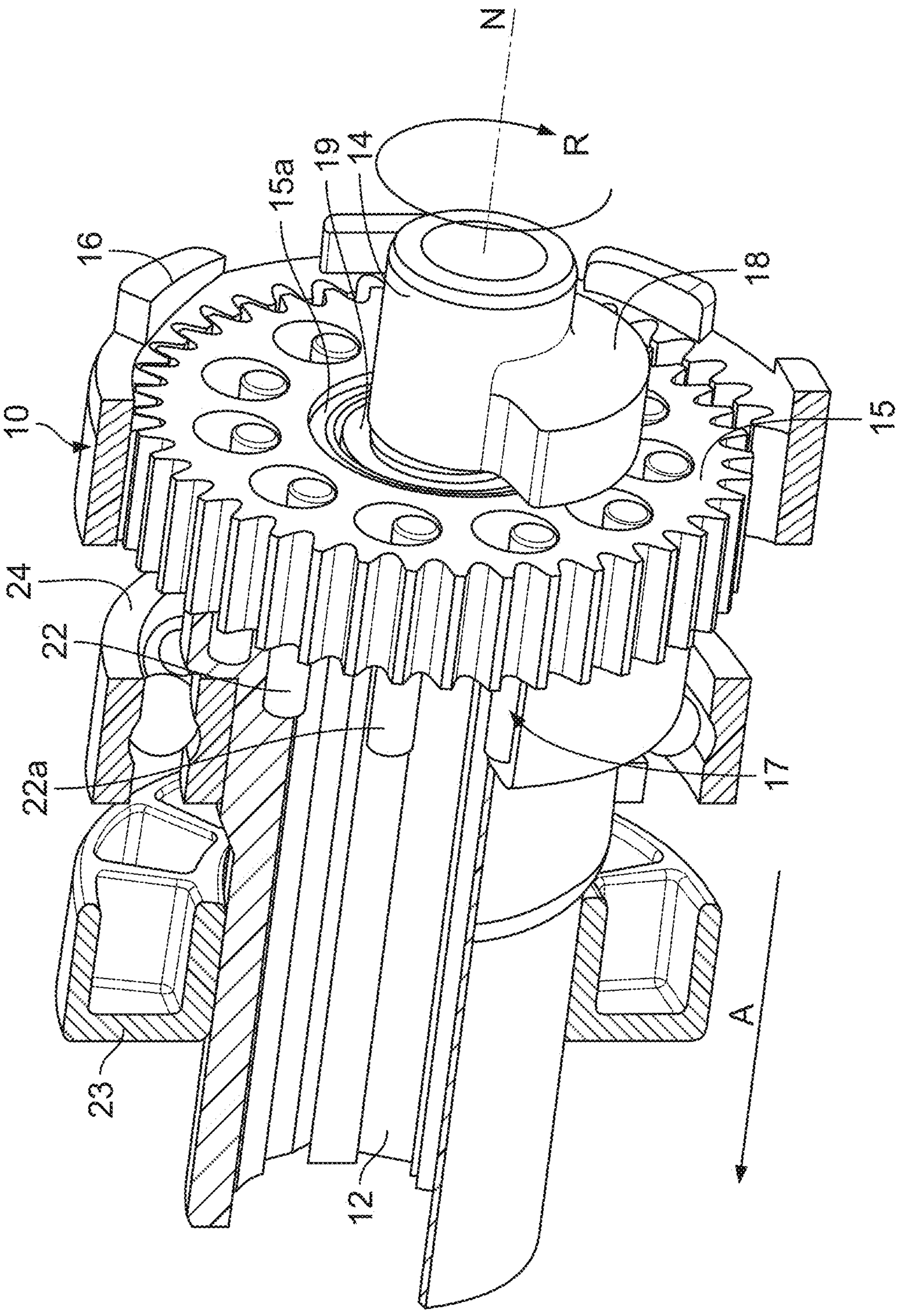
Figure 5:
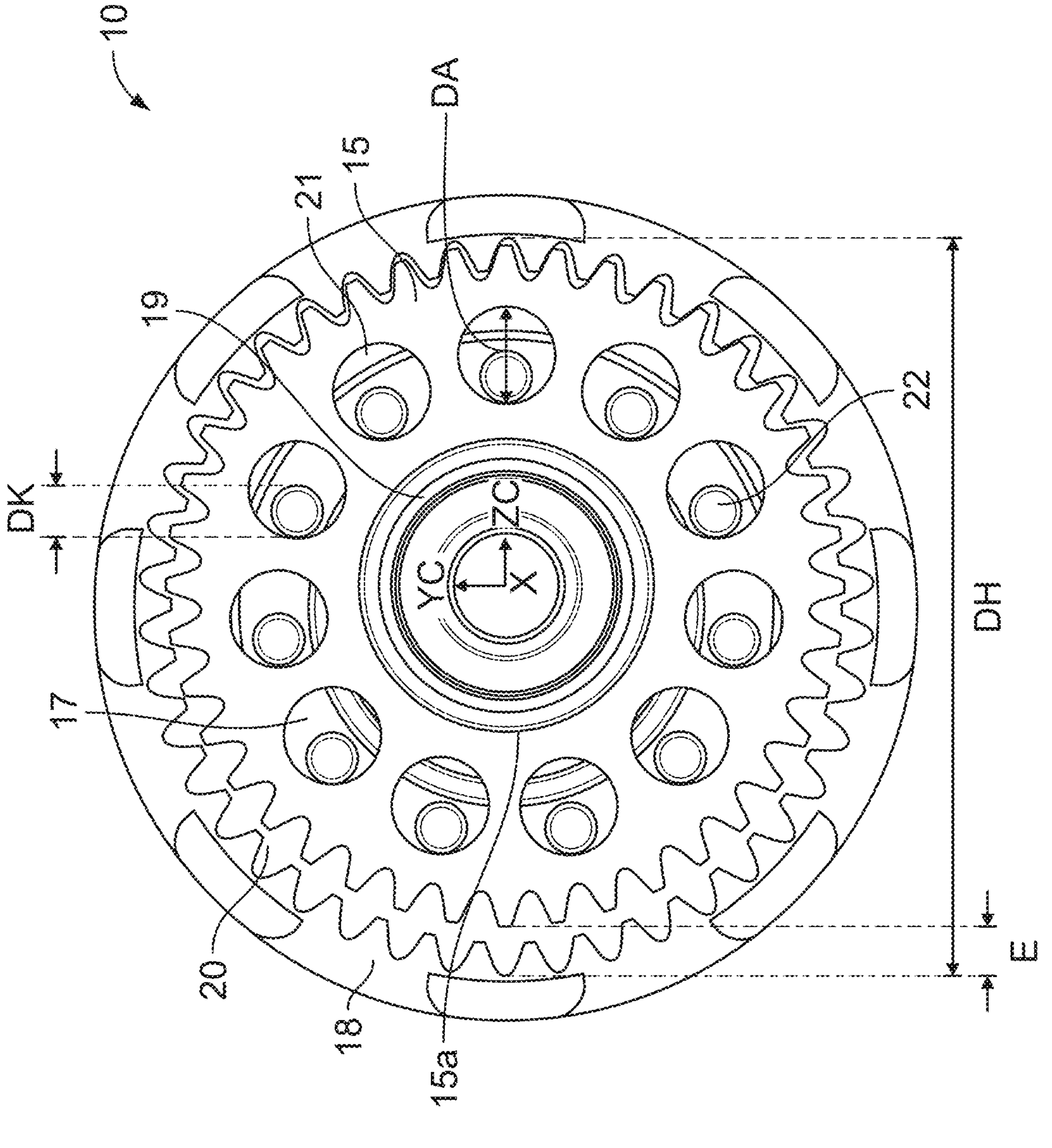
Figure 6:
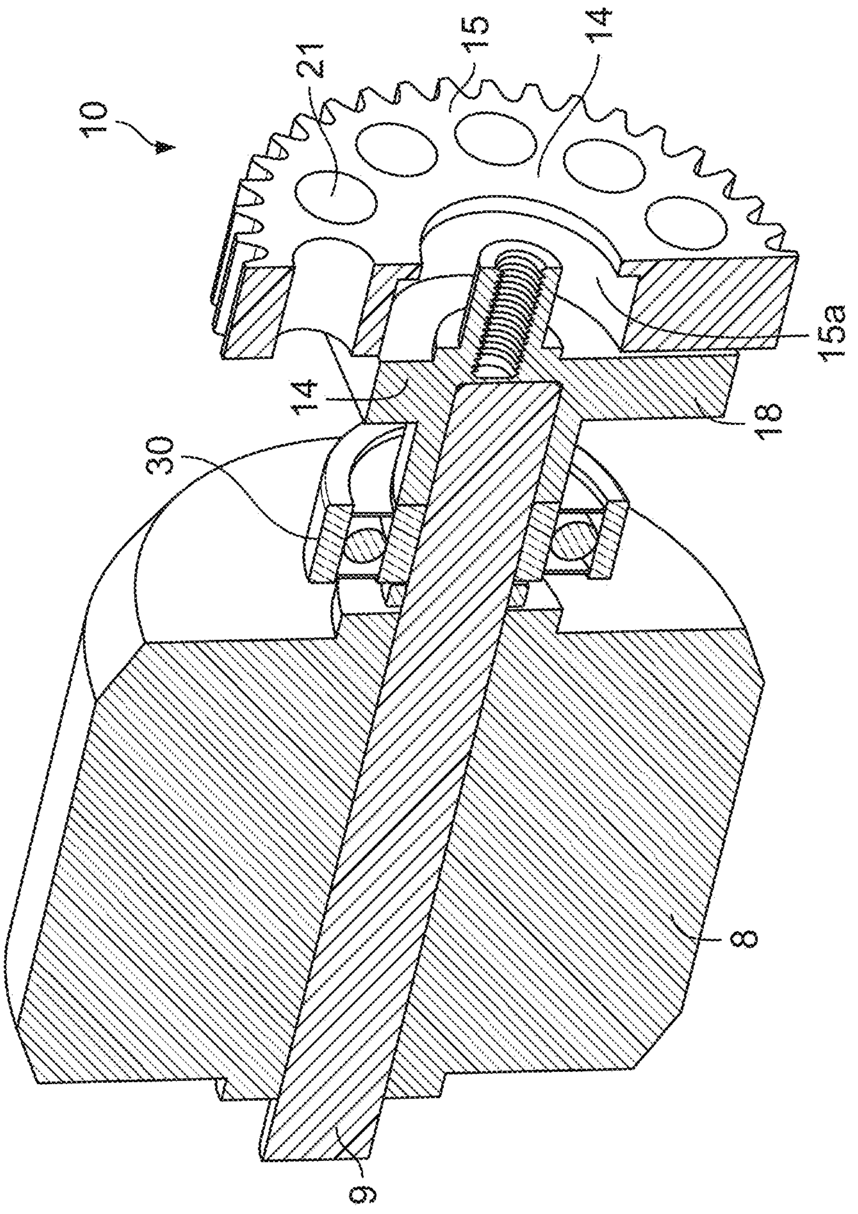
Figure 7:
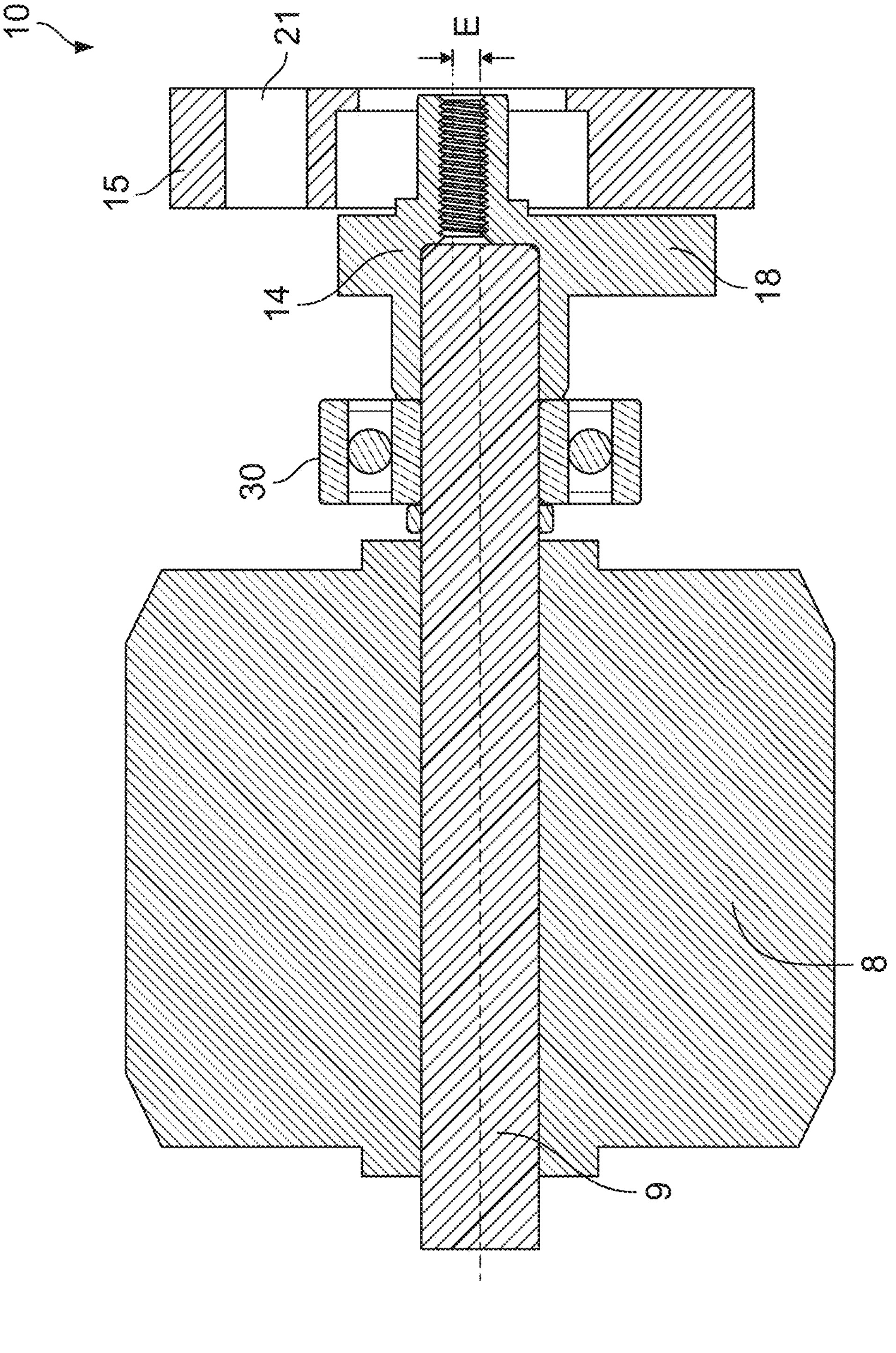
Figure 8:
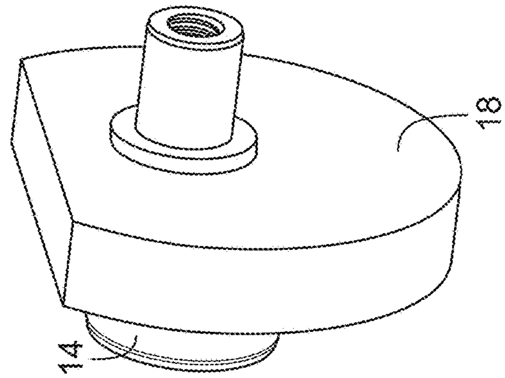
Figure 9:
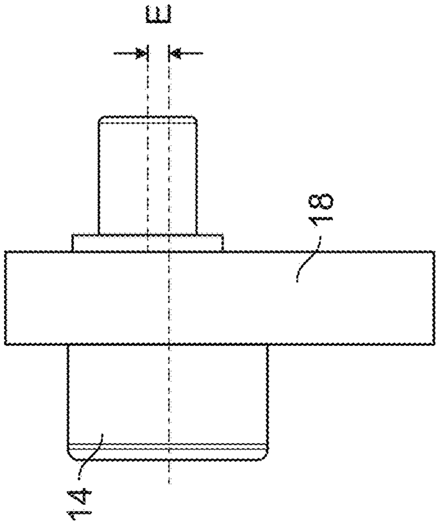
Figure 10:
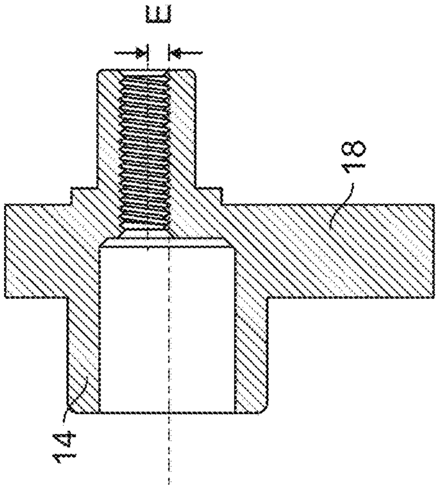

Specifically:

FIG. 1 shows a side view of a power tool in the form of a pipe press;

FIG. 2 shows a sectional side view of the power tool in the exemplary form of a pipe press, with a drive, an output shaft, a threaded spindle drive, a linear actuator and an eccentric transmission device;

FIG. 3 shows a perspective sectional view of the power tool in the exemplary form of a pipe press, with the drive, the output shaft, the threaded spindle drive, the linear actuator and the eccentric transmission device;

FIG. 4 shows a perspective sectional view of the eccentric transmission device with a part of the output shaft and a first and second bearing;

FIG. 5 shows a front view of the eccentric transmission device with a drive eccentric, an eccentric gear and a ring gear;

FIG. 6 shows a perspective sectional view of the drive, the output shaft, the first bearing, the drive eccentric and an eccentric gear;

FIG. 7 shows a sectional side view of the drive, the output shaft, the first bearing, the drive eccentric and the eccentric gear;

FIG. 8 shows a perspective view of the drive eccentric with a compensating weight;

FIG. 9 shows a side view of the drive eccentric with the compensating weight; and FIG. 10 shows a sectional side view through the drive eccentric.

DETAILED DESCRIPTION

FIGS. 1 to 3 show a power tool 1 according to the invention in an exemplary embodiment as a pipe press. Instead of the embodiment as a pipe press, the power tool 1 may also be embodied as any other cutting or deformation tool. In particular, it is also possible for the power tool 1 according to the invention to be embodied as a dispensing apparatus for chemical substances, such as adhesive or plugging compound. Such dispensing apparatuses can also be referred to as dispensers.

As can be seen in FIG. 1, the power tool 1 embodied as a pipe press substantially has a housing 2, a tool fitting 3 and a power supply 4.

The housing 2 of the power tool 1 is of substantially cylindrical form and comprises a front end 2*a*, a rear end 2*b*, a left-hand side surface 2*c*, a right-hand side surface 2*d* (opposite 2*c*), an upper side 2*e* and a lower side 2*f*. A central part 2*g* of the housing 2 serves as a handgrip for allowing the power tool 1 to be held and controlled.

The energy supply 4 is positioned at the rear end 2*b* of the housing 2 of the power tool 1. In the present exemplary embodiment, the power supply 4 is in the form of a rechargeable battery (also referred to as power pack or battery). The power supply 4 in the form of a rechargeable battery may be detachably connected by means of an interface 5 to the rear end 2*b* of the housing 2 of the power tool 1. The power tool 1 or the electrical consumers of the power tool 1 is or are supplied with electrical power by means of the rechargeable battery 4.

In an alternative embodiment of the present invention, the power supply 4 of the power tool 1 may also be embodied as an electrical cable for connecting the power tool 1 to an electrical grid source (that is to say electrical socket).

The tool fitting 3 is positioned, for detachably receiving and holding a tool 6, at the front end 2*a* of the housing 2 of the power tool 1. In the present exemplary embodiment, a tool 6 in the form of a deformation tool is positioned at the tool fitting 3. In the present exemplary embodiment, the deformation tool 6 is embodied as a so-called pressing head. The deformation tool 6 embodied as a pressing head serves substantially for the processing and in particular deformation of lines, that is to say pipes and tubes.

An activation switch 7 is positioned on the lower side 2*f* of the housing 2 of the power tool 1. The power tool 1 can be started and stopped by means of the activation switch 7.

Substantially a drive 8, a drive shaft 9, an eccentric transmission device 10, an output shaft 11 (see, e.g., FIG. 3), a threaded spindle drive 12 and a linear actuator 13 are positioned in the interior of the housing 2 of the power tool 1. In the present exemplary embodiment, the drive 8 is embodied as a brushless electric motor.

As illustrated in FIGS. 2, 3, 6 and 7, the drive 8 embodied as a brushless electric motor is connected via the drive shaft 9 to the eccentric transmission device 10. By means of the connection to the drive shaft 9, a torque generated in the drive 8 is transmitted from the drive 8 to the eccentric transmission device 10.

A rotational speed ratio between the drive 8 and the output shaft 11 can be generated by means of the eccentric transmission device 10.

As shown especially in FIG. 4, the eccentric transmission device 10 furthermore substantially comprises a drive eccentric 14, an eccentric gear 15, a ring gear 16, and a compensating coupling 17. The drive eccentric 14 has a compensating weight 18 (also referred to as a balance weight or balancing weight), which is connected to the drive 8 via the drive shaft 9, cf. FIGS. 8 to 10. A bearing 30 is positioned between the drive eccentric 14 and the drive 8, cf. FIGS. 6 and 7. The eccentric gear 15 contains an aperture 15*a* for a ball bearing 19. The drive eccentric 14 is fitted into the ball bearing 19 and is thereby connected to the eccentric gear 15 for conjoint rotation therewith. Rotation of the drive eccentric 14 in the direction of rotation R also causes the eccentric gear 15 to rotate accordingly with a wobbling motion.

Moreover, the eccentric gear 15 is positioned in the ring gear 16. The ring gear 16 is connected to the inside of the housing 2 of the power tool 1 in a rotationally fixed manner.

The eccentric gear 15 and the ring gear 16 have an involute toothing 20, cf. FIG. 5. The ring gear 16 has an inside diameter DH of 100 mm. According to an alternative embodiment, the inside diameter DH of the ring gear 16 can be between 20 and 200 mm.

Furthermore, the eccentric gear 15 contains a number of apertures 21 arranged in a circle around the drive eccentric 14. In the exemplary embodiment which is shown in the figures, the apertures 21 are in the form of eleven through holes. However, there may also be more or fewer than eleven through holes. According to an alternative embodiment, the apertures 21 can also be formed as blind holes.

In the present exemplary embodiment, the compensating coupling 17 is embodied as a parallel crank coupling with coupling elements 22. Each of the through holes 21 of the eccentric gear 15 serves to receive a coupling element 22 In the present exemplary embodiment, the coupling elements 22 are embodied as coupling pins.

The diameter DA of an aperture 21 embodied as a through hole is here twice as large as the diameter DK of a coupling element 22 embodied as a coupling pin.

The diameter of an aperture 21 here corresponds at least to the diameter of a coupling element 22 and to twice the value of the eccentricity E of the eccentric gear 15.

$$D_{aperture} \geq D_{coupling\ element} + (2 \times E)$$

$D_{aperture}$: diameter of the aperture $D_{coupling\ element}$: diameter of the coupling element E: eccentricity of the eccentric gear.

The compensating coupling 17 may therefore be referred to as a parallel crank coupling or alternatively as a pin or crank coupling.

As can be seen in FIG. 4, the free end 22*a* of each coupling pin 22 projects from the through holes 21 of the eccentric gear 15 in arrow direction A. The free ends 22*a* of each coupling pin 22 are in turn connected to the output shaft 11 in such a way that a torque can be transmitted from the coupling pins 22 of the compensating coupling 17 to the output shaft 11.

The output shaft 11 has substantially a cylindrical shape. With the aid of a main bearing 23 and a secondary bearing 24, the output shaft 11 is mounted in the interior of the housing 2 of the power tool 1. The main bearing 23 is embodied as a rolling bearing or ball bearing, and the secondary bearing 24 is embodied as a sliding bearing. According to an alternative exemplary embodiment, both the main bearing 23 and the secondary bearing 24 can be embodied either as a rolling bearing or a sliding bearing. According to an alternative embodiment, it is also possible for just a single bearing to be provided.

As already described above, the output shaft 11 is connected to the compensating coupling 17 of the eccentric transmission device 10. The output shaft 11 adjoins the threaded spindle drive 12. Here, the threaded spindle drive 12 is connected to the output shaft 11. The rotational movement of the output shaft 11 can be converted into a linear movement by means of the threaded spindle drive 12.

As can be seen in particular from FIGS. 2 and 3, the threaded spindle drive 12 is connected to the linear actuator 13.

The linear actuator 13 comprises substantially a compression spring 25 and a thrust rod 26. Here, the compression spring 25 acts as a restoring spring for the linear actuator 13.

A force flow diverting device 27 is provided at the linear actuator 13. By means of the linear actuator 13 and the force flow diverting device 27, the linear force of the linear actuator 13 is transmitted to the tool fitting 3 such that the tool 6 in the form of a pressing head can be moved between an open and a closed position.

The drive 8, which is embodied as an electric motor, can rotate with a rotational speed value of between 10 000 and 30 000 rpm at a maximum extension and retraction speed of the linear actuator 13. In particular, a rotational speed value between 15 000 and 18 000 rpm is provided for the drive 8.

LIST OF REFERENCE SIGNS

1 Power tool
2 Housing
2*a* Front end 2*a* of the housing
2*b* Rear end of the housing
2*c* Left-hand side surface of the housing
2*d* Right-hand side surface of the housing
2*e* Upper side of the housing
2*f* Lower side of the housing
3 Tool fitting
4 Power supply
5 Interface
6 Tool
7 Activation switch
8 Drive
9 Drive shaft
10 Eccentric transmission device
11 Output shaft
12 Threaded spindle drive
13 Linear actuator
14 Drive eccentric
15 Eccentric gear
15*a* Aperture in the eccentric gear
16 Ring gear
17 Compensating coupling
18 Compensating weight
19 Ball bearing
20 Involute toothing
21 Apertures in the eccentric gear
22 Coupling element
22*a* Free end on the coupling element
23 Main bearing
24 Secondary bearing
25 Compression spring
26 Thrust rod
27 Force flow diverting device
30 Bearing
DA Diameter of an aperture
DK Diameter of a coupling element
DH Inner diameter of the ring gear
E Eccentricity of the eccentric gear

What is claimed is:

1. A power tool comprising:
a drive;
an output shaft;
a threaded spindle drive connected to the output shaft;
a linear actuator, a torque generated by the drive being transmissible via the output shaft and the threaded spindle drive to the linear actuator; and
an eccentric transmission for a torque adaptation between the drive and the threaded spindle drive, the eccentric transmission including a drive eccentric drivable by the drive, an eccentric gear drivable by the drive eccentric, and a compensating coupling drivable by the eccentric gear and serving for transmitting torque from the eccentric gear to the output shaft.

2. The power tool as recited in claim 1 further comprising a ring gear fixedly connected to a housing, the ring gear and the eccentric gear having teeth defining an involute toothing between the ring gear and the eccentric gear.

3. The power tool as recited in claim 2 wherein the eccentric gear and the ring gear have a tooth number difference of 1 to 2 teeth.

4. The power tool as recited in claim 2 wherein the ring gear has between 20 and 200 teeth.

5. The power tool as recited in claim 2 wherein the ring gear has a maximum inside diameter of between 20 and 200 mm.

6. The power tool as recited in claim 2 wherein the ring gear is rotatably mounted in the housing.

7. The power tool as recited in claim 2 wherein the eccentric transmission at least partially consists of a metallic sintered material.

8. The power tool as recited in claim 2 wherein the eccentric transmission device at least partially consists of a polymer.

9. The power tool as recited in claim 1 wherein the compensating coupling is configured as a parallel crank coupling.

10. The power tool as recited in claim 1 wherein the eccentric transmission is configured in one stage and with a transmission ratio of 1:10 to 1:100.

11. The power tool as recited in claim 1 wherein the eccentric gear contains at least one aperture for receiving a coupling element of the compensating coupling, a diameter of the aperture corresponding at least to a diameter of a coupling element and to twice a value of an eccentricity of the eccentric gear.

12. A pipe press comprising the power tool as recited in claim 1.

* * * * *